United States Patent
Korde et al.

(10) Patent No.: US 12,129,820 B1
(45) Date of Patent: Oct. 29, 2024

(54) TUBULAR WAVE POWER DEVICE

(71) Applicants: National Technology & Engineering Solutions of Sandia, LLC, Albuquerque, NM (US); The Johns Hopkins University, Baltimore, MD (US)

(72) Inventors: Umesh Korde, Baltimore, MD (US); Ryan G. Coe, Taos, NM (US); Giorgio Bacelli, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/949,818

(22) Filed: Sep. 21, 2022

(51) Int. Cl.
*F03B 13/14* (2006.01)

(52) U.S. Cl.
CPC ............ *F03B 13/14* (2013.01); *F03B 13/142* (2013.01)

(58) Field of Classification Search
CPC .................................................... F03B 13/142
See application file for complete search history.

(56) References Cited

U.S. PATENT DOCUMENTS

| | | | | |
|---|---|---|---|---|
| 4,794,575 A | * | 12/1988 | Miller ................... | G10K 11/006 367/4 |
| 5,568,781 A | * | 10/1996 | Vaillancourt ........ | B63H 21/383 60/912 |
| 7,104,210 B2 | * | 9/2006 | Skinner ................. | D04H 3/12 428/113 |
| 2019/0353139 A1 | * | 11/2019 | Sheldon-Coulson ........ | F03B 13/142 |

FOREIGN PATENT DOCUMENTS

CN 213892852 U * 8/2021 ............. B63C 11/52

OTHER PUBLICATIONS

Machine translation of CN 213892852, dated Aug. 2021.*
U. A. Korde, et. al.; "Scoping and Concept Design of a WEC for Autonomous Power"; In OCEANS 2021: San Diego—Porto, pp. 1-6, San Diego, CA, Sep. 2021; doi: 10.23919/OCEANS44145. 2021.9705660. https://ieeexplore.ieee.org/document/9705660.

* cited by examiner

*Primary Examiner* — Shafiq Mian
(74) *Attorney, Agent, or Firm* — Daniel J. Jenkins

(57) ABSTRACT

A tubular wave energy converter configured to remain afloat near the surface of a wave field and trap a water column oscillating asymmetrically to the wave field in which the converter is located. Water column oscillations create a pressure flux providing motive power for a generator. The converter, generator and a powered payload making up an autonomous wave powered device are packaged to fit within and be deployed by a torpedo launcher. The autonomous device may be deployed above or beneath the surface. Device buoyant characteristics are configured to maintain the device afloat and self-righting toward an upright oriented for operation in the wave field.

10 Claims, 3 Drawing Sheets

TUBULAR WAVE POWER DEVICE

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to wave energy converters, and more particularly directed to a wave energy converter designed to fit within a standard torpedo hull and provide autonomous power.

BACKGROUND OF THE INVENTION

There is a so-called "blue economy" developing around devices such as oceanographic research sensors, water desalination systems, aquaculture, and recharging stations for autonomous underwater vehicles (AUV) deployed in marine environments. Such blue economy devices typically have been deployed with on-board power supplies (batteries) capable of only limited operation before the battery must be replaced. Battery replacement requires a service trip to the device location. Other devices may include solar panels to generate power and replenish on-board energy stores to extend the operable service interval. While this approach may reduce or eliminate periodic service demands, an effective solar array may be significantly larger than the powered device and therefore require deployment of a much larger autonomous structure. Additionally, solar panel power generation may not be viable for all geolocations at which device placement is desired Wave energy converter (WEC) design has traditionally targeted large-scale devices for grid generation. However, more recently there is increasing interest in WEC designs to supply smaller, portable blue economy devices in a variety of marine power applications.

Large WECs typically include wave absorber structures that are either fixed or moored to maximize the degree of the wave amplitude available as input for energy conversion. Free floating wave energy converters rely on differences in oscillation frequencies between the wave absorber structure in a wave field (the sea) and water trapped inside the wave absorber structure. As such, free floating WECs may be limited in energy conversion potential compared to WECs relying on fixed absorber structures. As the size of the WEC is reduced to match the size limitations that might be imposed on free-floating, autonomous devices, the energy capture potential may be further reduced.

Deploying autonomous devices and their attendant power supplies should be safe, simple, and rely on systems already in common use in marine environments. Deployment of a powered device and an attendant power supply that requires assembly or other specialized activities in situ may not be practical.

What is needed are systems and methods that overcome the deficiencies and limitations of the prior art.

SUMMARY OF THE INVENTION

The present disclosure is directed to a wave energy converter having a hollow tubular structure open at one end having mass and buoyancy configured for free-floating deployment in a body of water having a wave field. The tubular structure is configured to oscillate out of phase with oscillations of a water column inside of the tubular structure. A power take-off opposite of the open end delivers an oscillating pressure pulse to an energy conversion system which, in turn, powers a device. The device is mounted to the wave energy converter and moves in unison therewith.

One embodiment of the present disclosure includes a wave power device with a hollow tube structure having an open end and a power take-off end. A power output system is connected to the power take-off end to power a payload connected to the wave power device. The tube structure is configured with mass and buoyancy to keep the tube structure, power output system, and payload afloat with the tube structure in a generally upright, open end downward orientation. The device and a water column contained within the tube structure sympathetically oscillate in response to the surrounding wave field, creating oscillating pressure pulses at the power take-off end to drive the power output system. The tube structure and the water column contained therein are configured to have a couple natural frequency matching the predominant frequency of the surrounding wave field.

Another embodiment of the present disclosure includes a tubular wave power device with a hollow tube structure having an open end and a power take-off end. A power output system is connected to the power take-off end to power a payload connected to the wave power device. Mass and buoyancy characteristics of the hollow tube structure are configured to keep the tube structure, power output system, and payload afloat with the tube structure in a generally upright, open end downward orientation. The device sympathetically oscillates in a wave field which causes a water column within the tube structure to oscillate in an asymmetric oscillation mode, creating oscillating pressure pulses at the power take-off end to drive the power output system. The tubular wave power device is configured to fit within a conventional torpedo tube launcher and to be deployed thereby.

Another embodiment of the present disclosure includes a method for deploying a wave energy device and payload package in which a tubular wave power device and a powered payload are configured to fit within a conventional torpedo tube launcher and be launched thereby. The torpedo launcher may be located above or below the water surface when the device is deployed. The wave energy device may be configured to fit wholly or partially within a torpedo hull for launch. Once deployed, all or portions of the hull may be separated from the wave energy device to allow operation. The device sympathetically oscillates in a wave field which causes a trapped water column within the device to oscillate in an asymmetric oscillation mode, creating oscillating pressure pulses at the power take-off end to drive the power output system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The present disclosure is a free-floating wave energy converter. Unlike wave energy converters (WEC) in which wave absorber structures are either fixed or moored to maximize the degree of the wave amplitude available as input for energy conversion, free floating wave energy converters rely on differences in oscillation frequencies between the wave absorber structure and an oscillating water column trapped inside the wave absorber structure. Free floating WECs having dimensions much smaller than the wavelength of the surrounding wave field will oscillate generally with the surrounding wave field. A water column trapped inside of the absorber structure may oscillate in unison with the absorber structure but is more likely to oscillate out of phase with the absorber structure due to hydrodynamic influence of the absorber structure on the water column trapped therein compared to the unconstrained wave field in open seas.

The wave energy converter of the instant disclosure utilizes an oscillating water column type primary converter. A coupled dynamic model based on the theory of oscillating pressure distributions within floating bodies was used to derive the hydrodynamic coefficients and forcing terms needed. An approximate two-degree of freedom rigid-body model was used to determine design parameters for the device. Frequency-domain solutions provide an assessment of the dynamic response and power conversion characteristics of the device in a range of wave climates.

Figures 1, 2:
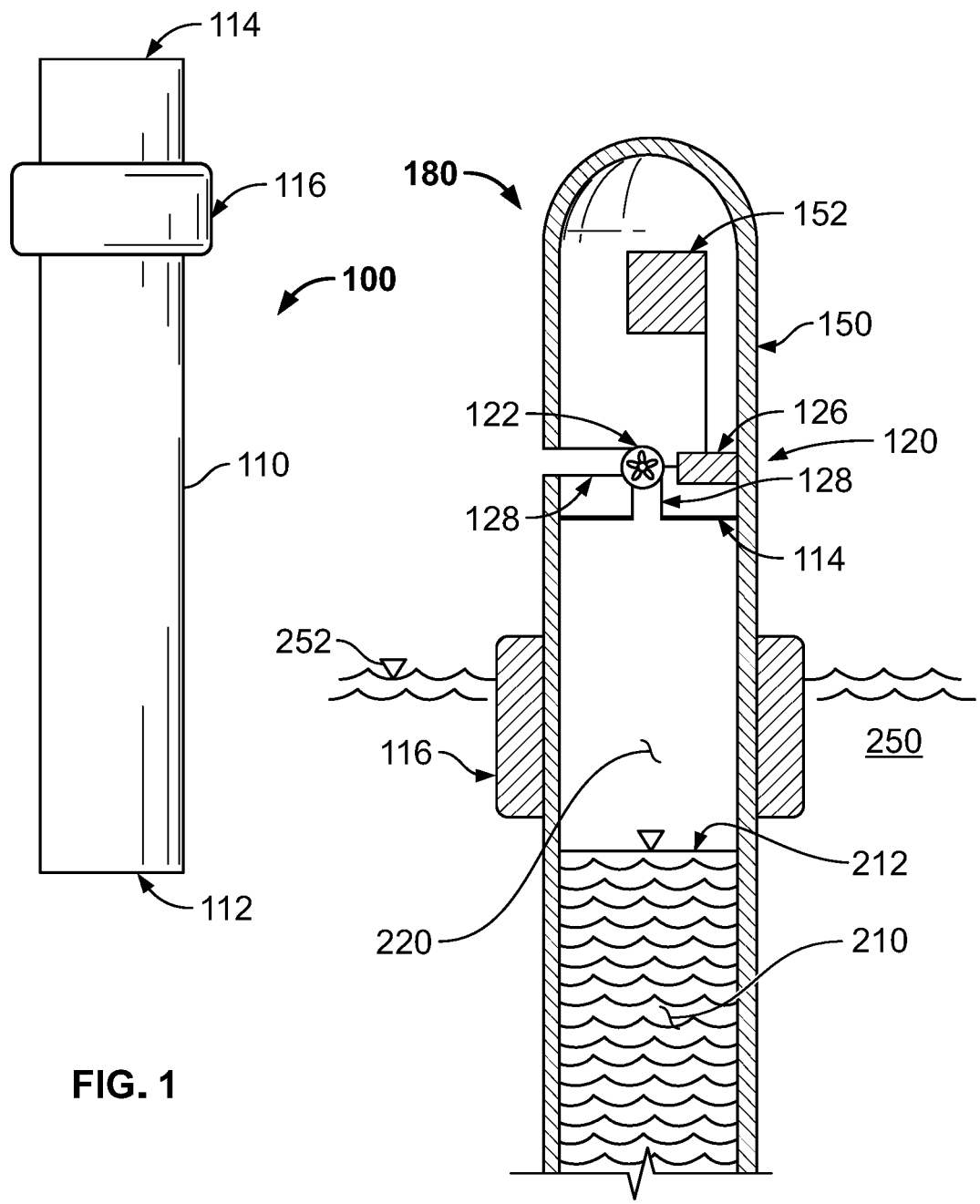
FIG. 1 is a side elevation view of one embodiment of a wave energy converter.
FIG. 2 is a vertical section view of an autonomous wave energy powered device incorporating the wave energy converter of FIG. 1.
Figure 3:
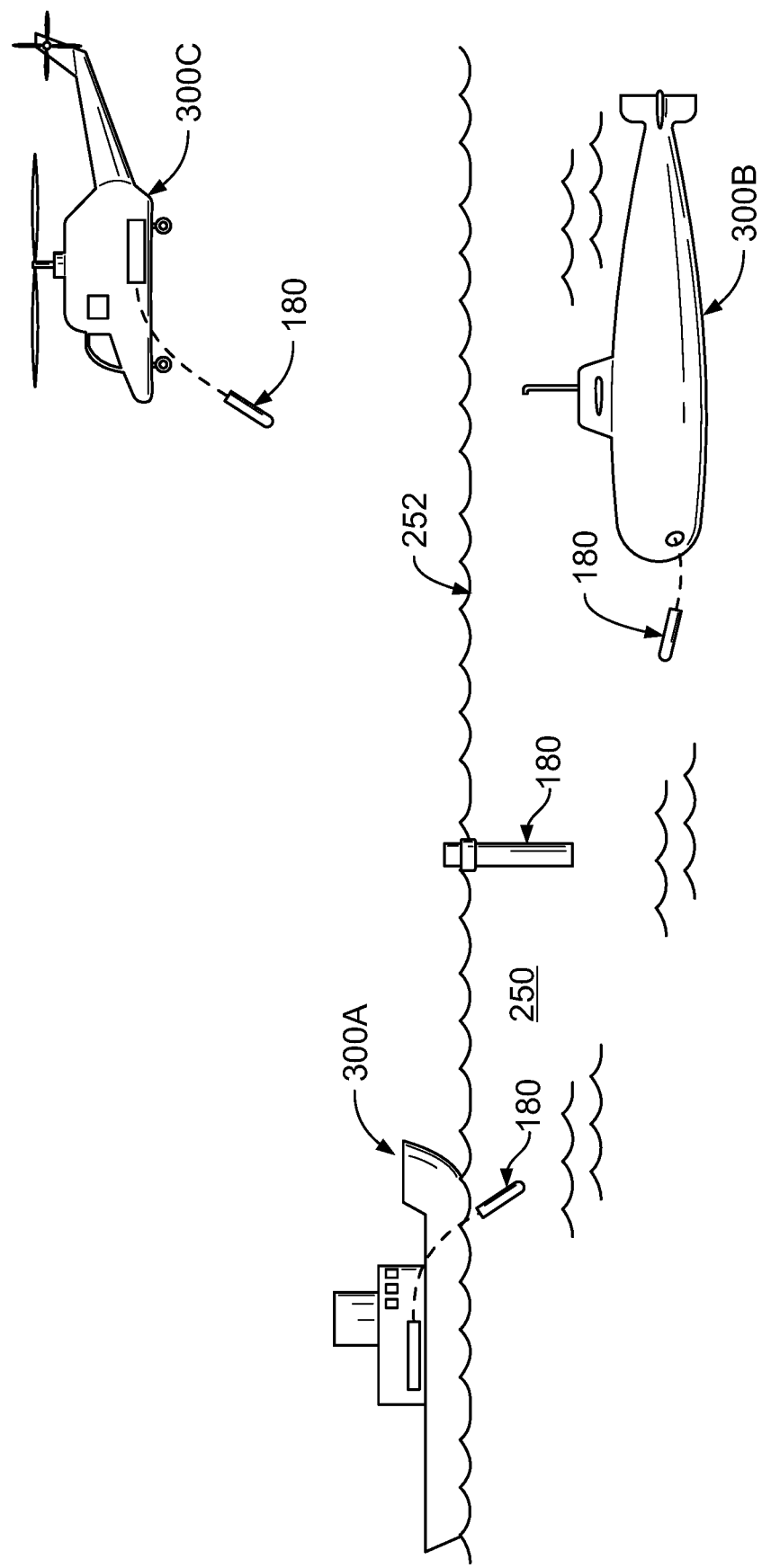
FIG. 3 is a representation of multiple means by which the autonomous wave energy powered device of FIG. 2 may be deployed in a body of water.
Figure 4:
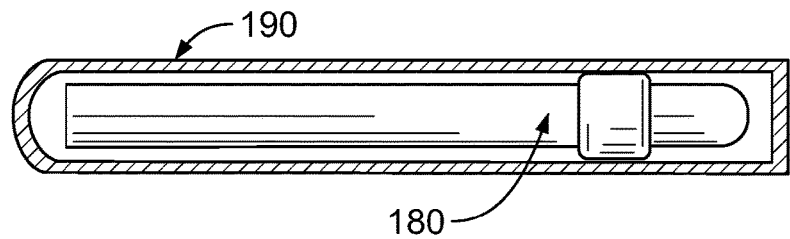
FIG. 4 illustrates a first embodiment of a deployment apparatus for conveying the autonomous wave energy powered device of FIG. 2 to a desired location.
Figure 5:
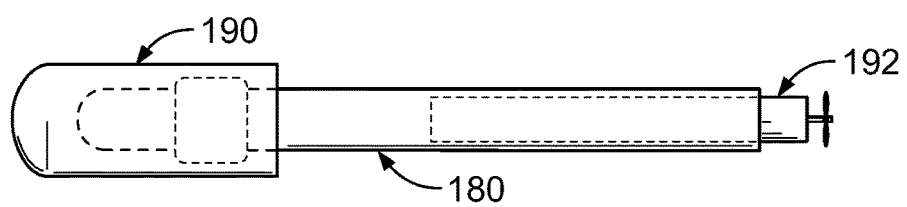
FIG. 5 illustrates a second embodiment of a deployment apparatus for conveying the autonomous wave energy powered device of FIG. 2 to a desired location.
Figure 6:
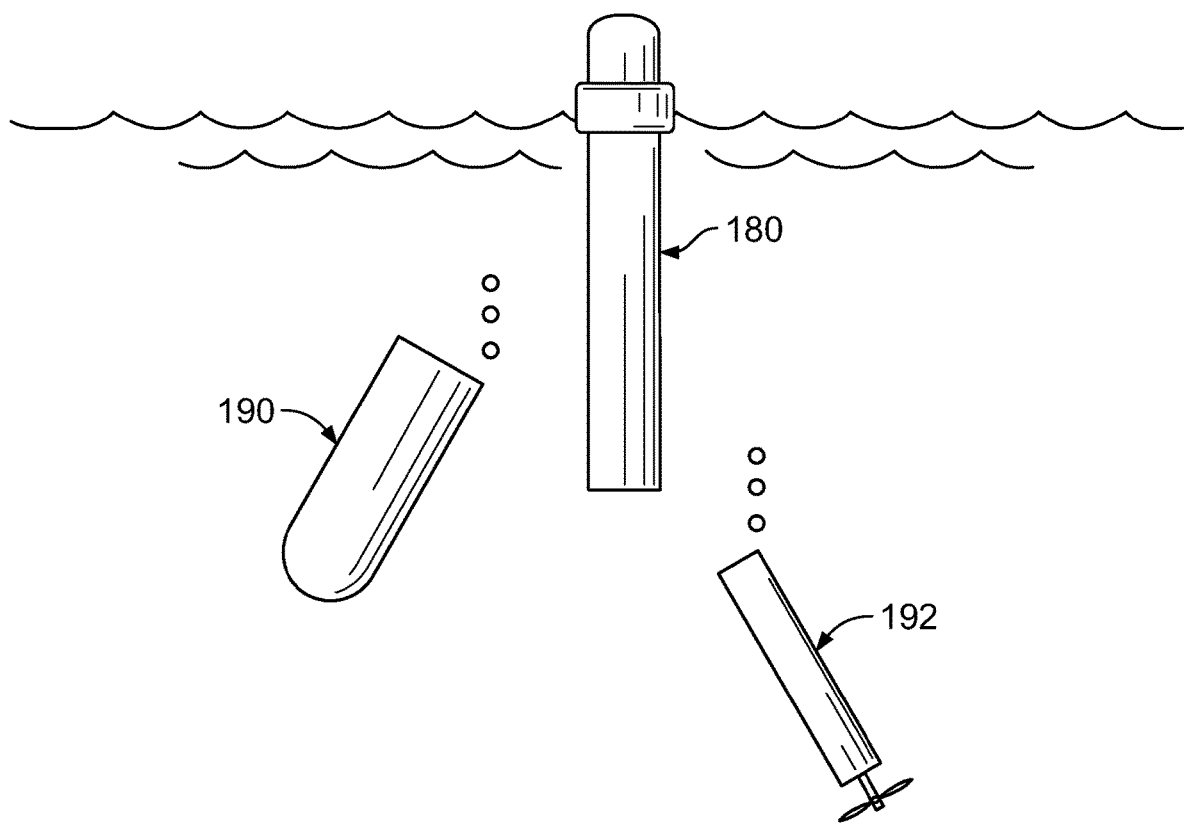
FIG. 6 illustrates an embodiment of a deployment apparatus for conveying the autonomous wave energy powered device of FIG. 2 in which the deployment device is being jettisoned following conveyance.

FIGS. 1 and 2 show a representation of the device being modeled here. Small-amplitude waves and small-amplitude motions are assumed. The hydrodynamically more accurate model treats a coupled system wherein the oscillating pressure inside the oscillating water column chamber interacts with the surrounding wave field and the moving hull of the tube 110 with the flotation collar (float) 116. A more approximate model treats the water 210 inside the tube hull as a quasi-rigid body whose oscillations are dynamically coupled to the oscillations of the tube that contains it. The expectation is that the tube and water column diameters are small enough (relative to realistic wave lengths) for the water plane inside the tube to rise and fall uniformly.

This analysis technique is first used to estimate the two natural frequencies of the two-degree-of-freedom system formed by the float and the quasi-rigid body oscillating water column. This analysis can thus readily be used for design purposes. Heave oscillation is assumed to dominate. Assuming that the tube 110 with the oscillating water column 210 is small in diameter relative to the wavelengths of interest, the oscillating water column is modeled as a single heaving body with rest-mass equal to the mass of the water in the tube. Its oscillation is coupled to that of the buoy via stiffness, as water displaced by its oscillation causes a force on the buoy and vice versa.

In the present work, this model is used for geometry design and for estimation of the two coupled natural frequencies of the device in heave. Letting $M_1$ denote the sum of in-air mass and infinite-frequency added mass for the collar+the small mass of the tube structure, with $M_2$ representing the equivalent quantity for the water in the tube, $$M_1 = \rho A_{wp} D_r + \bar{a}(\infty); \text{ and } M_2 = \rho a_{wp} l(1+l_\infty). \tag{1}$$

The tube thickness is assumed to be small and its mass is neglected in this analysis. The stiffness constants for the two masses are, $$k_1 = \rho g A_{wp}; \text{ and } k_2 = \rho g a_{wp}. \tag{2}$$

Here, $D_r$ denotes the draft at which the collar structure floats, $\bar{a}(\infty)$ denotes the infinite-frequency added mass for the collar+tube structure, while $l$ and $l_\infty$ denote the length and infinite-frequency added-length of the water in the tube. Since the interest here is in using this approximation to predict the approximate natural response of the system, damping effects are ignored. For the same reason, exciting forces, radiation forces (including frequency-dependent radiation damping and frequency-dependent added mass) also do not need to be included in the present model.

With the help of free-body and kinetic diagrams, the equations of motion for the two-degree of freedom system here can be written as, $$M_1 \ddot{x}_1 = k_1 x_1 - k_2(x_1 - x_2),$$

$$M_2 \ddot{x}_2 = k_2(x_1 - x_2). \tag{3}$$

These equations can easily be rewritten in matrix form. Along the way, letting $$x_1 = X_1 e^{i\Omega t}, \; x_2 = X_s e^{i\Omega t} \tag{4}$$

represent a trial solution for natural oscillations at frequency $\Omega$ at complex amplitudes $X_1$ and $X_2$, equations (3) become, $$\Omega^2 MX + KX = 0. \tag{5}$$

Letting $\lambda = \Omega^2$, rearranging terms, and multiplying through by $M^{-1}$, $$M^{-1}KX = AX = \lambda X. \tag{6}$$

Equation (6) represents an eigenvalue problem. The two eigenvalues $\lambda_1 > \lambda_2$ give the two coupled natural frequencies according to, $$\Omega_1 = \sqrt{\lambda_1}, \text{ and } \Omega_2 = \sqrt{\lambda_2}, \tag{7}$$

where the positive square-roots are used. The two eigenvectors $e_1$ and $e_2$ represent the two modes of oscillation. The first mode $e_1$ at $\Omega_1$ comprises in-phase oscillations of the two masses $m_1$ and $m_2$, while in the second mode, the two masses oscillate with opposite phases. Since the goal here is to utilize the relative oscillations between the collar+tube structure and the water within the tube, the asymmetric mode is of most interest. For optimal power production, the WEC should be configured so that the $\Omega_2$ frequency matches the frequency in the wave field in the general area of WEC deployment.

The presently disclosed wave energy converter (WEC) 100 includes a hollow tube structure 110 having an open end 112 and a power take-off end 114. A float 116 may be connected to tube structure 110 and longitudinally positioned on the tube structure to buoyantly support the tube in a body of water 250 proximate to the surface 252 thereof and located in relation to a center of mass so that the structure floats in a generally vertical orientation with open end 112 downward when placed in the body of water. Float 116 may be externally disposed on the tube structure as shown, or internally disposed to allow a uniform diameter of the tube structure along its length. Numerous other known means for providing buoyancy in the tube structure, such as air or flotation chambers, and adjusting the centers of mass and buoyancy in the WEC using ballast are contemplated within the scope of this disclosure.

A power output system 120 is connected to power take-off end 114 and driven by the oscillating pressurized air flow flux caused by the combined action of the surrounding wave field and buoyant oscillations of the tube structure and float. Trapped water column 210 oscillation inside the tube is driven both the surrounding wave field and the tube structure and float oscillation which causes air pressure in air chamber 220 to rise and fall as a surface 212 of the trapped water column oscillates. The power output system is configured to restrict the power take-off end of the tube structure and direct the entire air flow flux between the tube structure interior and the surrounding environment through the power output system. In one embodiment (example, FIG. 2), the power output system may include an impeller 122 placed in a conduit 128 connecting the air chamber 220 and the surrounding environment that is and driven by pressure differential therebetween. Rotation of the impeller may, in turn, most conveniently drive an electrical generator 126 to power payload devices.

The WEC is designed to fit inside of a torpedo tube. The float diameter and length, the tube structure diameter and length, and the float position on the tube structure in relation to the open end are configured to result in sympathetic oscillation in response to the surrounding wave field. The WEC configuration is tuned so that the tube structure 110 and the water column 210 contained therein have a couple natural frequency matching the predominate frequency of the wave field at the intended site of operation. Antisymmetric relative oscillation enables the power transfer to the WEC from the surrounding wave field to be highly efficient. Additionally, the placement of a preferred air turbine at the power take-off end and the turbine slip ratio are such that power transfer from the turbine from the air flow excited by the relative water column oscillation is also maximized.

A payload 150 may be connected to the wave energy converter 100 to form an autonomous wave energy powered device 180. Payload 150 may comprise sensors, instrumentation, energy storage batteries, and/or communication devices 152. The payload 150 is preferably integrally connected to the WEC for ease in deployment as an autonomous unit, such as a self-powered oceanographic sensors which have been reported to be operable on 20 W or less. Autonomous underwater vehicles (AUV) require, on average, 200 W of power. The power output system generator may power the payload devices directly or be used to charge a storage battery to normalize power availability during calm wave periods.

The body of water into which the WEC (including the payload) is placed defines a wave field surrounding WEC 100 which causes it to sympathetically oscillate. Open end 112 allows water to flow into and out of the hollow tube interior creating an oscillating trapped water column 210 in the tube interior. It is preferred that the oscillating water column 210 only partially fill the hollow tube interior and that an air chamber 220 be maintained above a surface boundary 212 below the power take-off end. The much small dimensions of the tube structure compared to the wave field in which the WEC is positioned results in oscillation of the trapped water column being asynchronous to oscillation of the wave field.

Tube structure 110 may be configured as a long and slender cylinder. Dimensions of the tube structure and float may be chosen to tube the system so that the natural frequency of the oscillating water column therein is in resonance when the wave field in which the WEC is placed and oscillating asynchronous to the oscillations of the WEC and the wave field. A tube structure diameter which defines oscillating water column response as $\Omega_2 = \sqrt{\lambda_2}$ when deployed in a wave field having a frequency $\Omega_2$ is preferred. Favorable power output performance has been predicted in embodiments having a tube structure diameter of approximately 0.5 meters and a length ranging between approximately 4.5 and 7.5 meters.

Tube structure characteristics can be altered so that the natural frequency of the water column oscillating in the tube structure is in resonance with the wave field and oscillates asymmetrically to the wave field. The influence of the power system may also result in oscillation of the wave energy converter asynchronous to the wave field which may further increase the amplitude of trapped water column oscillation within the tube structure and amplify the power generation potential of the converter device.

The configuration of float 116 may consider buoyancy and mass distributions of the WEC (tube structure, power output system) or the wave energy powered autonomous device (WEC and payload) necessary for self-righting, dynamic stability, freeboard minimization, or combinations thereof. Ideally, the float should be configured to minimize freeboard to maximize the tube structure length available to contain trapped water column oscillation while maintaining the WEC in a generally upright orientation.

The tubular configuration of the WEC is preferred to simplify deployment of a WEC-powered autonomous device 180. By establishing dimensions of the WEC, including the tube structure, float, power output system, and payload, to fit within the dimensional envelope of a torpedo, numerous convenient options for autonomous device 180 deployment become available. Torpedo launchers are widely available on surface 300A and subsurface marine vessels 300B as well as aircraft 300C, each functioning as a readily available and capable delivery vehicle to transport and deploy the device in a body of water 250 proximate to a desired geographic location. Use of a standard system for deployment eliminates the need to develop and provide specialized launching systems on the delivery vehicles.

The WEC-powered autonomous device may include a delivery apparatus 190, such as a sacrificial casing, to protect the payload and/or power output system during deployment from the launch vehicle. The sacrificial casing may fully or partially envelope the WEC-powered autonomous device during deployment. Portions of the delivery apparatus may be used for the WEC, for example the tube structure. The delivery apparatus 190 may include a propulsion apparatus 192 to deliver the autonomous device to a more precise geographic position or to assist in raising the autonomous device to the surface. The sacrificial casing may be fully or partially jettisoned once autonomous device 180 has been launched and approaches a desired position near the surface.

The WEC-powered autonomous device 180 may be configured with integral active means to seal openings and protect sensitive portions of the payload and power output system during launch which reposition to allow the autonomous device to function. The payload 150 may be externally configured to streamline the WEC autonomous device for undersea deployment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tubular wave power device comprising:
  a tubular structure configured to be torpedo tube launchable and capable of powering an autonomous device;
  wherein the tubular structure comprises:
    a power take-off internal to the tubular structure that comprises an impeller, wherein the impeller is driven by oscillating pressurized air flow in and out of the tubular structure caused by action of surrounding water wave field and buoyant oscillations of the tubular structure; and
    a power output system connected to the power take off.

2. The tubular wave power device of claim 1, wherein the power take-off comprises an oscillating water column style wave energy converter drivetrain.

3. The tubular wave power device of claim 2, wherein the tubular structure has mass and buoyancy geometrically distributed in the tubular structure to cause asymmetric relative oscillation of a water column contained within the tubular structure when the tubular structure and water column are excited by the surrounding water wave field surrounding the wave power device.

4. The tubular wave power device of claim 3, wherein the geometric distribution of the tubular structure mass and buoyancy may be tuned to wave characteristics at an operation location.

5. A wave power device comprising:
  a hollow tube structure with an open end and a power take-off end; and
  a power output system connected to the power take-off end;
  the hollow tube structure and power output system configured to be torpedo tube launchable with mass and buoyancy configured to keep the tube structure and power output system afloat with the tube structure in a generally upright, open end downward orientation, the tube structure buoyantly oscillating in a surrounding wave field when placed therein causing asymmetric oscillation of a water column contained therein, water column oscillation creating a varying pressure differential at the power take-off end and thereby provide motive force to the power output system;
  wherein the power take-off comprises an impeller disposed within the hollow tube structure, wherein the impeller is driven by oscillating pressurized air flow in and out of the tubular structure caused by action of surrounding water wave field and buoyant oscillations.

6. The wave power device of claim 5, wherein the wave power device is free floating in the wave field.

7. The wave power device of claim 5, wherein the tube structure is configured to cause sympathetic oscillation of the tube structure and the water column contained therein in response to the surrounding wave field.

8. The wave power device of claim 7, wherein the tube structure is configured such that the tube structure and water column contained therein have a coupled natural frequency matching the predominant frequency of the surrounding wave field.

9. A method of operating a wave energy powered device comprising:
  providing a wave energy powered device comprising a wave energy power device and an autonomous device, the wave energy device having a tubular structure configured to fit within a torpedo tube dimensional envelope and capable of powering the autonomous device;
  providing a delivery vehicle having a torpedo launcher sized to launch the wave energy powered device, transporting the wave energy powered device to a desired geographic location using the delivery vehicle;
  loading the wave energy powered device into the torpedo launcher; and
  ejecting the wave energy powered device from the torpedo launcher into a body of water;
  wherein the wave energy powered device comprises a power take-off comprising an impeller disposed within the tubular structure, wherein the impeller is driven by oscillating pressurized air flow in and out of the tubular structure caused by action of surrounding water wave field and buoyant oscillations.

10. The method of claim 9, wherein the delivery vehicle is a surface marine vessel, a sub-surface marine vessel, or an aircraft.

* * * * *